(12) United States Patent
Storz et al.

(10) Patent No.: US 6,864,989 B2
(45) Date of Patent: Mar. 8, 2005

(54) METHOD FOR ILLUMINATING AN OBJECT WITH LIGHT FROM A LASER LIGHT SOURCE

(75) Inventors: Rafael Storz, Bammental (DE); Johann Engelhardt, Bad Schoenborn (DE); Holger Birk, Meckesheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 131 days.

(21) Appl. No.: 09/939,726

(22) Filed: Aug. 28, 2001

(65) Prior Publication Data

US 2002/0043618 A1 Apr. 18, 2002

(30) Foreign Application Priority Data

Aug. 28, 2000 (DE) .......................................... 100 42 114

(51) Int. Cl.$^7$ .............................................. G01B 11/24
(52) U.S. Cl. ...................................................... 356/601
(58) Field of Search ............................. 356/601, 237.2, 356/277.5, 614; 250/559.42

(56) References Cited

U.S. PATENT DOCUMENTS

| | | | | |
|---|---|---|---|---|
| 6,122,046 A | * | 9/2000 | Almogy | 356/237.2 |
| 6,186,628 B1 | * | 2/2001 | Van de Velde | 351/205 |
| 6,201,608 B1 | * | 3/2001 | Mandella et al. | 356/491 |
| 6,369,888 B1 | * | 4/2002 | Karpol et al. | 356/237.5 |
| 6,556,290 B2 | * | 4/2003 | Maeda et al. | 356/237.2 |

* cited by examiner

Primary Examiner—Rodney Fuller
(74) Attorney, Agent, or Firm—Foley & Lardner LLP (57) ABSTRACT

A method for illuminating an object with light (2) from a laser light source (3), preferably in a confocal scanning microscope (1). With the method according to the invention, it is possible to reduce the coherence length of the laser light, so that disruptive interference phenomena can be substantially eliminated. Should interference phenomena nevertheless be formed, these are to be influenced in such a way that they have no effect on the detection. The method according to the invention is characterized in that the phase angle of the light field is varied by a modulator in such a way that interference phenomena do not occur in the optical beam path, or occur only to an undetectable extent, within a predeterminable time interval.

25 Claims, 11 Drawing Sheets

METHOD FOR ILLUMINATING AN OBJECT WITH LIGHT FROM A LASER LIGHT SOURCE

CROSS REFERENCE TO RELATED APPLICATIONS

This invention claims priority of the German patent application 100 42 114.8 which is incorporated by reference herein.

FIELD OF THE INVENTION

The present invention relates to a method for illuminating an object with light from a laser light source, preferably in a confocal scanning microscope.

BACKGROUND OF THE INVENTION

Laser light sources are used in a large number of devices and applications for illuminating objects. In this case, in particular, the advantages of high coherence length and excellent beam profile, i.e. parallelism of the light radiation emitted by the laser light source, the outstanding frequency or wavelength consistency, and the monochromaticity of the light are utilized.

The high spatial and temporal coherence of laser light is due to the stimulated emission by the optical medium in the laser, and has the effect that both the individual wavelets and the waves emitted at different times interfere virtually without limitation. The coherence length l of a laser is related to the linewidth δv by the equation $$l = c/(2\pi \delta v)$$

where c is the speed of light. Accordingly, a linewidth δv=100 MHz corresponds to a coherence length l=0.5 m. The linewidth, or the coherence length, of a laser light source also depends very greatly on the time interval over which the linewidth or the frequency of the laser light source is measured. For example, with large integration times, a laser oscillator exhibits long-term effects which are proportional to the time interval of the measurement and are caused by linear drift of the laser oscillator, for example due to temperature variations.

For some applications, however, a high coherence length is a problem since it can lead to the formation of undesired interference phenomena in the optical beam path. Especially in confocal scanning microscopy, such interference phenomena can induce imaging aberrations.

BRIEF DESCRIPTION OF THE DRAWINGS

There are, moreover, various possible ways of advantageously configuring and developing the teaching of the present invention, as may be seen in the figures.

DETAILED DESCRIPTION OF THE INVENTION

It is therefore an object of the present invention to provide a method with which the coherence length of the laser light can be reduced, so that disruptive interference phenomena can be substantially eliminated. Should interference phenomena nevertheless be formed, these are to be influenced in such a way that they have no effect on the detection.

The method according to the invention of the generic type achieves the above object. According thereto, such a method is characterized in that the phase angle of the light field is varied by a modulator in such a way that interference phenomena do not occur in the optical beam path, or occur only to an undetectable extent, within a predeterminable time interval.

Figure 1:
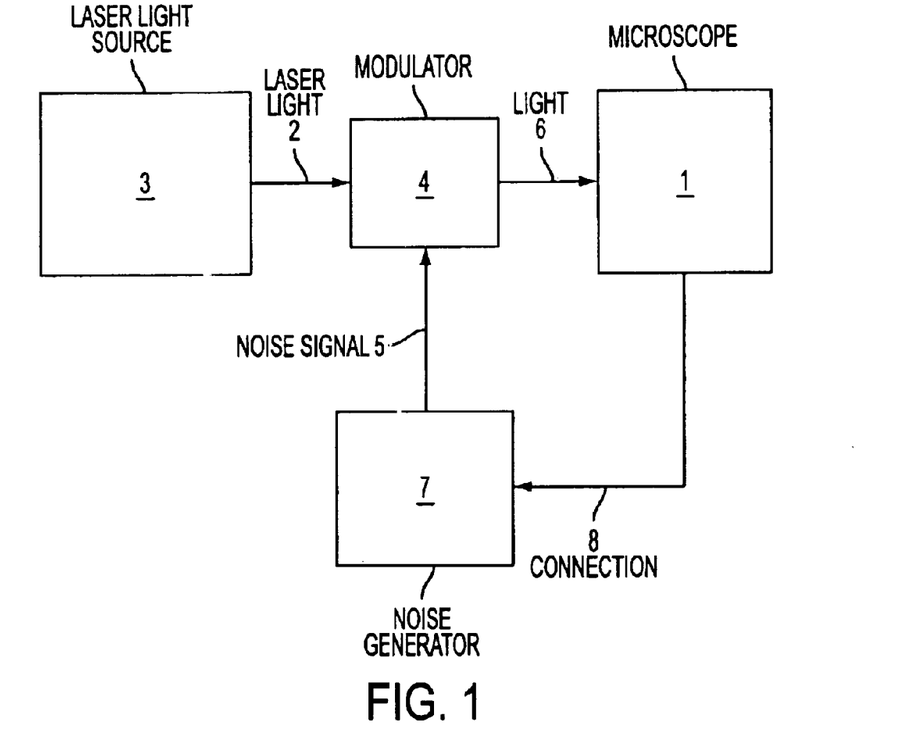
FIG. 1 shows a diagrammatic representation of a confocal scanning microscope in which the method according to the invention is used.

FIG. 1 shows a schematic representation of a confocal scanning microscope 1, in which an object is illuminated with light 2 from a laser light source 3. According to the invention, the phase angle of the light field is varied by a modulator 4 designed as an EOM, in such a way that interference phenomena do not occur in the optical beam path, or occur only to an undetectable extent, within a predeterminable time interval.

The EOM 4 is arranged directly downstream of the laser light source 3. A stochastic noise signal 5 is applied to the EOM 4, so that laser light 2 passing through the EOM 4 has a broadened spectral linewidth after its transmission and, accordingly, is injected into the confocal scanning microscope 1 as light 6 with a smaller coherence length. A noise generator 7 is used to produce the noise signal 5.

Via the connection 8, the modulation of the EOM 4 is synchronized with the scanning process of the confocal scanning microscope 1.

According to the invention, it has been recognized for the first time that disruptive interference phenomena in the optical beam path can be avoided if the coherence length of the light emitted by the laser light source is less than the optical path in the illumination beam path. Even if disruptive interference phenomena are formed in the optical beam path, a suitable modulation means can be used to vary these suitably so that within a predeterminable time interval, which may depend on a detection instrument, the interference phenomena per se are not detectable.

With the aid of the method according to the invention, it is particularly advantageously possible to use solid-state laser systems, including semiconductor or diode lasers. It is thereby also possible to use narrow-band gas lasers. These laser systems are not so complicated to deal with, and they are less expensive and more compact.

Likewise, frequency-doubling laser systems and OPOs (optical parametric oscillators) could be used for confocal scanning microscopy.

Several variants are provided for practical embodiment of the method according to the invention.

In a first variant, an EOM (electo-optical modulator) is employed as the modulation means. This EOM is arranged directly downstream of the laser light source, so that the laser radiation emitted by the laser light source passes through the EOM. The EOM can vary the phase angle of the light field in such a way that broadening of the spectral linewidth of the laser radiation is thereby achieved. In this case, a noise signal, a periodic signal or a stochastic signal could be applied to the EOM, so that spectral components are superimposed on the laser light and so that the linewidth of the laser radiation is increased to the linewidth of the superimposed signal.

In a second variant, a mirror, a lens or a beam splitter is used as the modulation means 4. This modulation means 4 is also arranged downstream of the laser light source. It is mounted in such a way that it also vibrates or oscillates as a result of vibrations or oscillations of the optical structure 12 or of the casing 14 as show in FIGS 2 and 11. In the simplest case, this could involve a lens which is merely placed, but not fixed, in a lens frame. The slight vibrations or oscillations of the device, which are in any case induced, for example, by fans, cause the lens itself to oscillate. The mirror, the lens or the beam splitter could also be moved with the aid of a control element 13, as show in FIG. 3. The control element could, for example, be a piezo element to which a corresponding control signal is applied.

Figure 2:
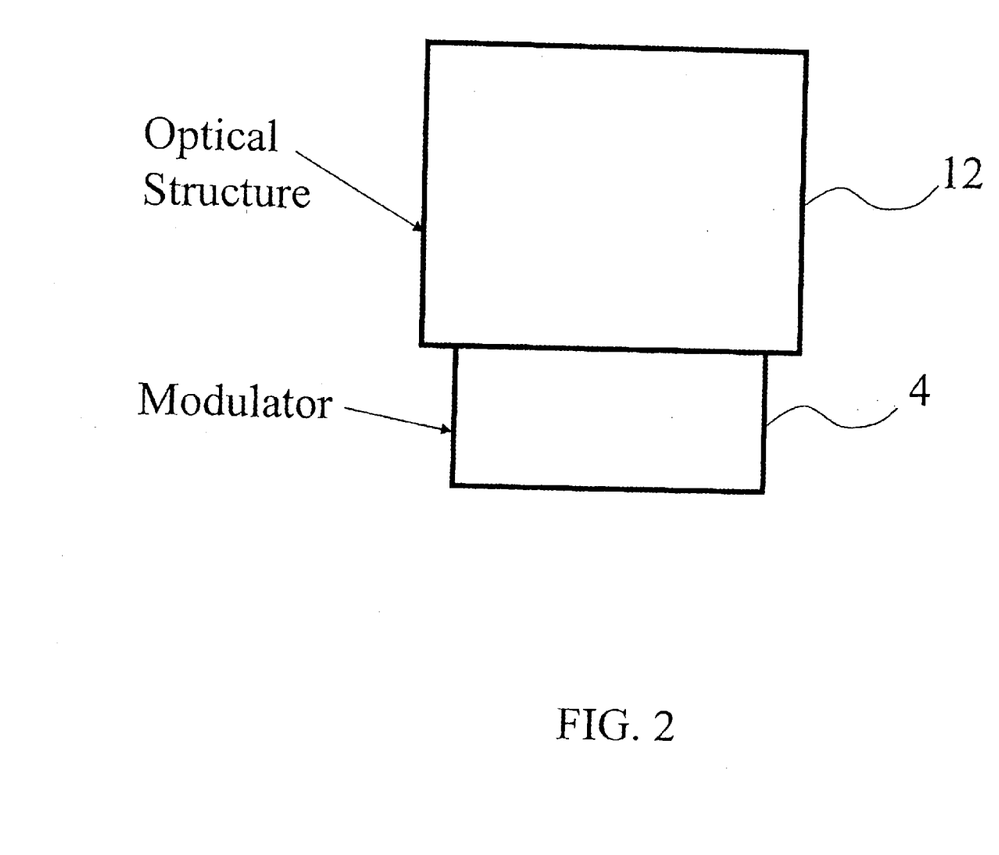
FIG. 2 shows a schematic representation of a modulation means and an optical structure.
Figure 3:
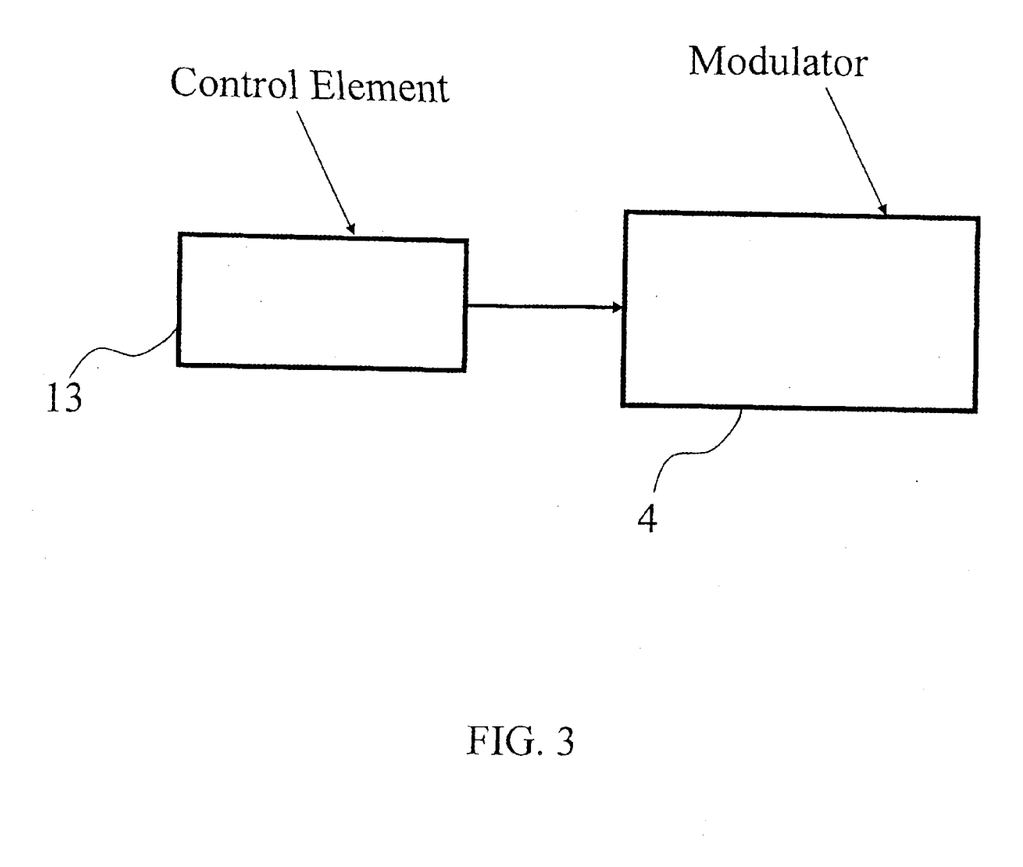
FIG. 3 shows a schematic representation of a control element and a modulation means.
Figure 11:
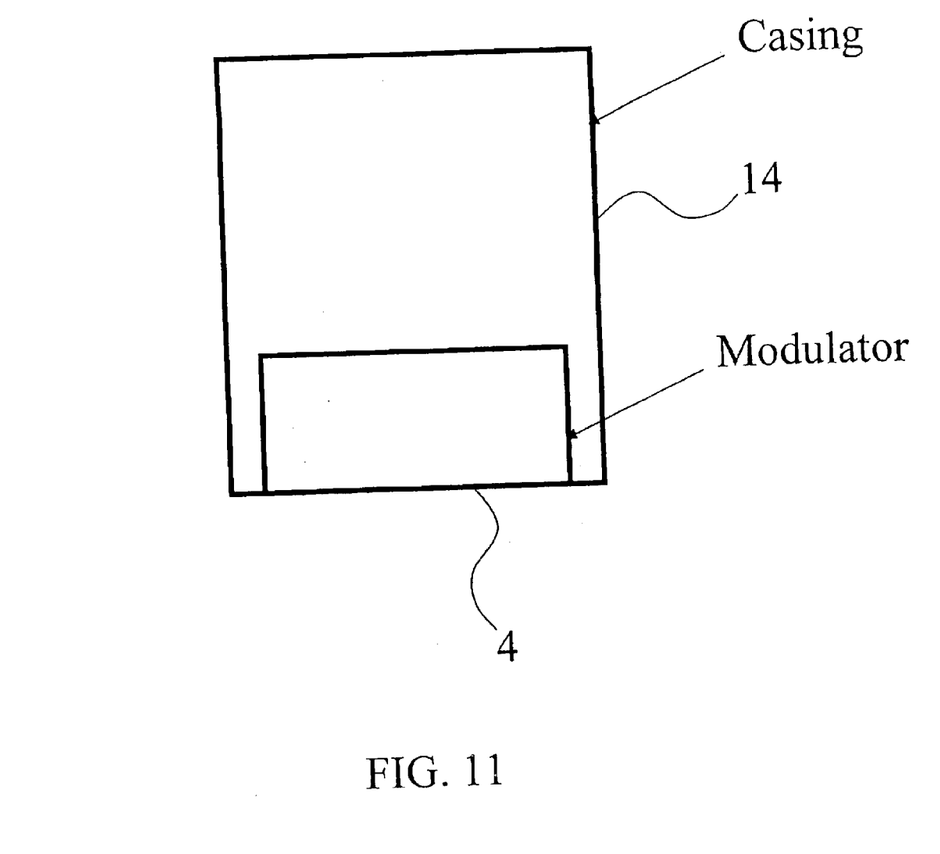
FIG. 11 shows a modulation means and a casing.

As a result of the oscillation, vibration and/or movement of the modulation means, the optical path of the light radiation can be stochastically varied, i.e. the length of the optical path is thereby stochastically varied. Owing to the stochastic variation of the optical path, interference phenomena which may occur in the predetermined time interval are also modified, so that an integral detector—a detector which, for example, records the cumulative sum of the light intensity within the predetermined time interval—does not detect the—interference phenomenon per Se, and accordingly the measurement result is also not disruptively influenced.

Figure 4:
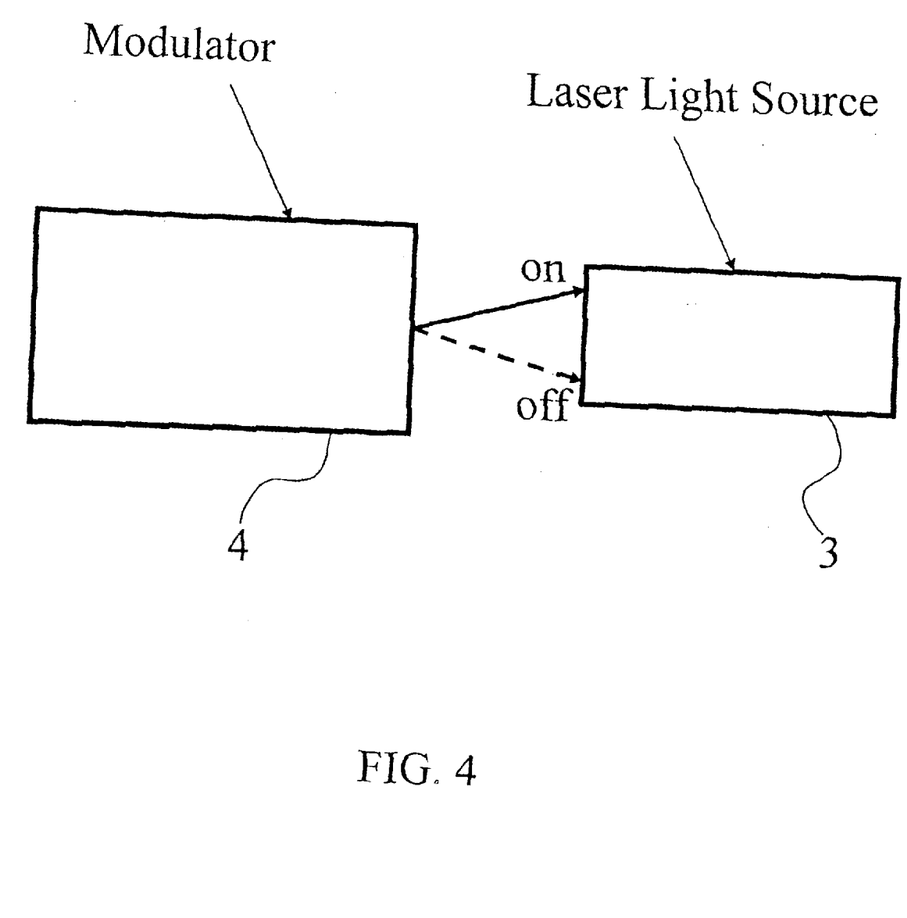
FIG. 4 shows a schematic representation of a laser light source and a modulation means.
Figure 5:
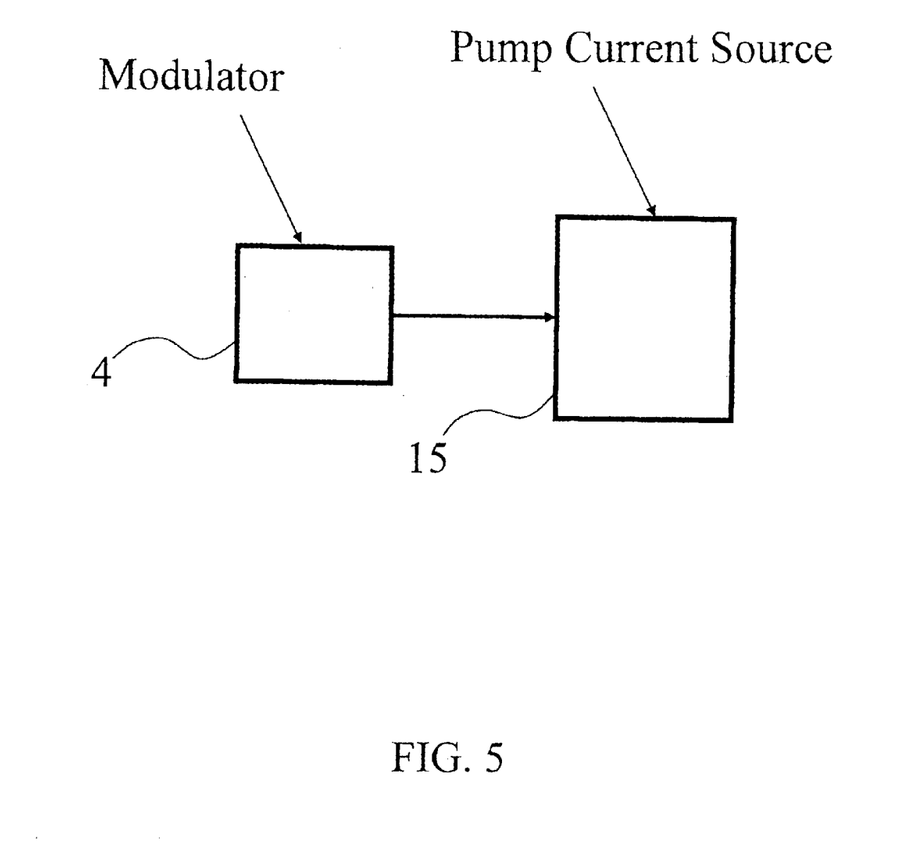
FIG. 5 shows a schematic representation of a modulation means and a pump current source.

In a third variant, provision is made for the modulation means 4 to influence the laser light source 3. For instance, a modulation means 4 could switch the laser light source on and off, as can be seen by way of example in FIG. 4. This process of switching on and off would need to take place at least once within the predeterminable time interval. The switching on and off could be performed by corresponding modulation of the pump current 15 of the laser, as is shown schematically in FIG. 5, specifically, for example, if the modulation means 4 periodically interrupts the pump current. More generally, provision could be made for the modulation means 4 to influence the pump current 15 of the laser. In this case, for example, the pump current 15 of a diode laser could be sinusoidally modulated so that the light power emitted by the diode laser is also periodically modified. In this way, it could be possible to vary the wavelength of the light emitted by the diode laser, which should be taken into account in a practical application.

Figure 6:
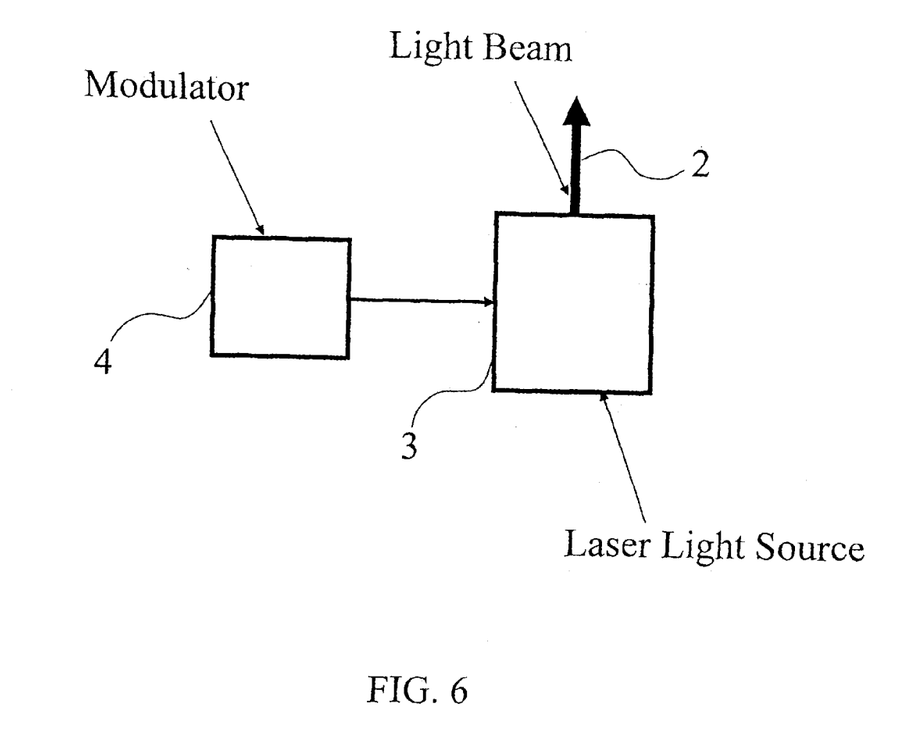
FIG. 6 shows a schematic representation of a modulation means and a laser light source emitting a laser beam.

As an alternative to this, provision is made to influence the intensity of the laser from the light source 3, as shown in FIG. 6. This could be done using conventional methods for influencing intensity in laser light sources, for example by Q-switching or cavity dumping.

Figure 7:
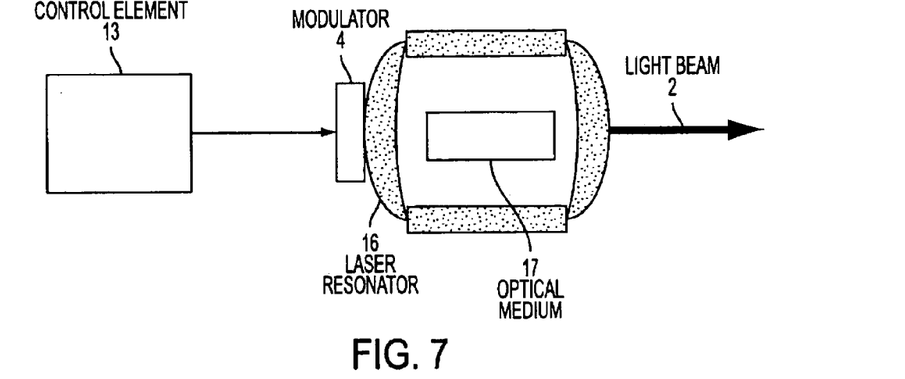
FIG. 7 shows a schematic representation of a laser resonator, a modulation means, and a control element.
Figure 8:
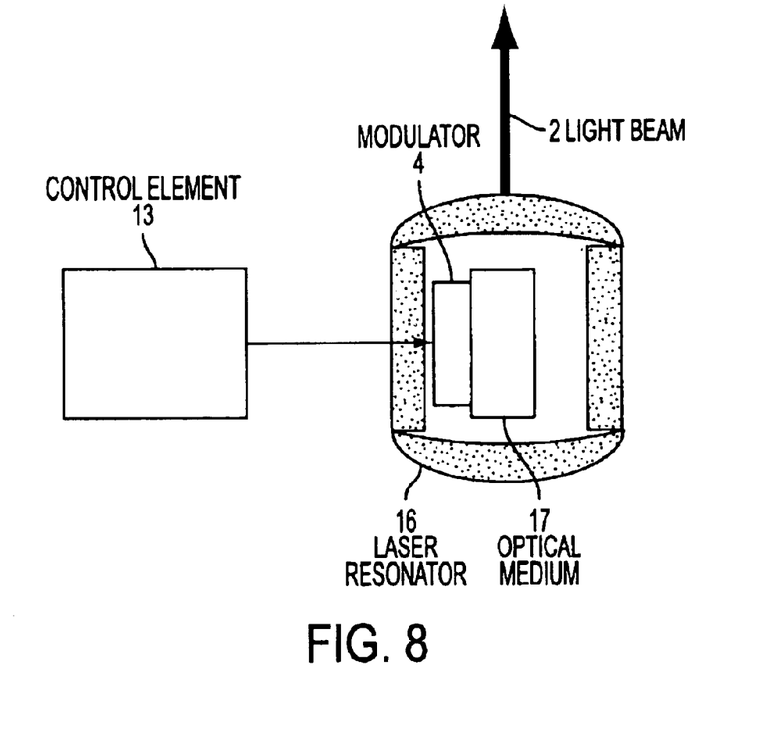
FIG. 8 shows another schematic representation of a laser resonator, a modulation means, and a control element.

Furthermore, the modulation means could influence a laser resonator 16 or the optical medium 17 of the laser, as shown in FIG. 7. In practical terms, provision could be made for the modulation means 4 to be configured as a piezo element which moves and/or deforms at least one component of the laser resonator 16 and/or the optical medium 17, as shown in FIG. 8. In practical terms, the piezo element could be connected directly or indirectly to the optical medium 17, for example to the laser crystal. Using corresponding circuit interconnection of the piezo element, its extension is then transmitted to the optical medium 17 and the laser is hence perturbed from its normal operation.

More generally, provision is made for a signal to be applied to the modulation means. The signal could be a noise signal, a periodic signal or a stochastic signal. Accordingly, for example, a noise signal could be applied to the modulation means configured as an EOM and a stochastic signal could be applied to the modulation means configured as a control element. A noise generator could be used to produce the noise signal.

In practical terms, provision is made for the method according to the invention to be used in a confocal scanning microscope. This could, for example, involve a confocal scanning microscope for inspecting products in the semiconductor industry. A confocal fluorescence laser scanning microscope or a biconfocal scanning microscope would also be feasible. The predeterminable time interval in which the modulation means varies the phase angle of the light field, when using the method according to the invention in conjunction with a confocal scanning microscope, would need to be selected so that it is shorter than the pixel clock. The term "pixel clock' in confocal scanning microscopy means the time interval involved when the light intensity values measured during scanning the object are cumulatively allocated to a pixel. Preferably, the predeterminable time interval is selected so that it is shorter than the time interval corresponding to half the pixel clock, so that the interference phenomena which may occur in the optical beam path are varied whenever possible during the predeterminable time interval. As a result of this, the interference phenomena do not occur to a detectable extent.

The modulation of the phase angle of the light field is synchronized with the scanning process of the confocal scanning microscope. This is useful, in particular, with a view to specifying the time interval, i.e. for example the pixel clock, for successful implementation of the method according to the invention. More generally, the modulation of the phase angle of the light field can be synchronized with the object illumination process to be carried out.

Figure 9:
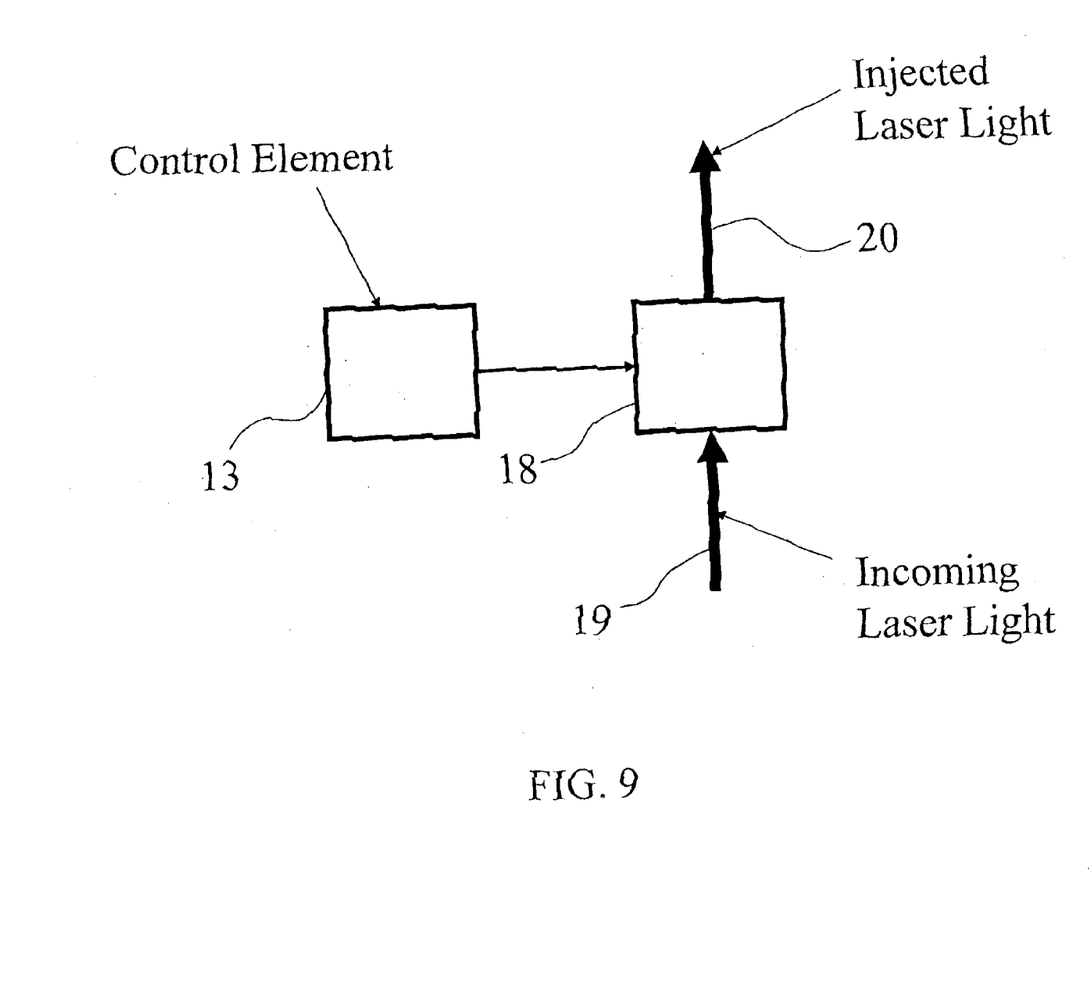
FIG. 9 shows a schematic representation of a control element and an AOTF.
Figure 10:
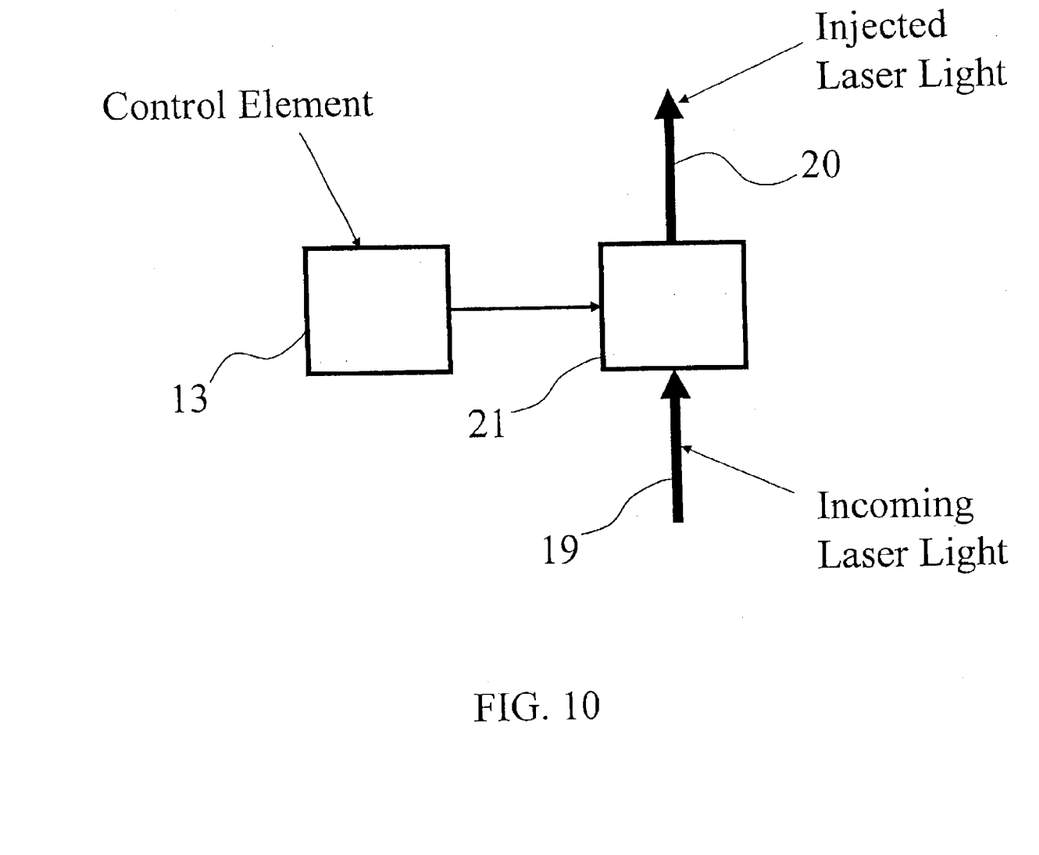
FIG. 10 shows a schematic representation of a control element and an AOBS.

A change in the wavelength of the laser light due to the modulation is advantageously taken into account by the control unit 13 of an AOTF (acousto-optical tunable filter) 18 or AOBS (acousto-optical beam splitter) 21, as shown in FIGS. 9 and 10, respectively. This component is provided for injecting the laser light 20 into the optical structure, or the confocal scanning microscope. The injection by an AOTF 18 or AOBS 21 is in this case normally adjusted only for a limited wavelength range of the laser light so that, in the event of a change in the wavelength of the laser light due to the modulation, the control unit 13 of the AOTF 18 or AOBS 21 should be changed correspondingly so as not to reduce the injection efficiency.

In a similar way, it would be conceivable for the control unit of an AOTF or AOBS, which injects the laser light, to take into account a change in the power of the laser light due to the modulation. The injection efficiency can again hence be kept substantially constant.

Lastly, it should more particularly be pointed out that the exemplary embodiments discussed above are merely used to describe the claimed teaching, but do not restrict it to the exemplary embodiments.

What is claimed is:

1. Method for illuminating an object with light from a laser light source comprising varying the phase angle of a light field with a modulator in such a way that interference phenomena do not occur in the optical beam path, or occur only to an undetectable extent, within a predeterminable time interval, wherein a mirror, a lens or a beam splitter is used as the modulator.

2. Method according to claim 1, wherein the modulator is mounted in such a way that it also vibrates or oscillates as a result of vibrations or oscillations of the optical structure or of the casing.

3. Method according to claim 2, wherein the optical structure is a portion of a confocal scanning microscope.

4. Method according to claim 1, wherein the modulator is moved using a control element.

5. Method according to claim 4, wherein the control element is a piezo element.

6. A confocal scanning microscope adapted to perform the method of claim 1.

7. Method for illuminating an object with light from a laser light source comprising varying the phase angle of a light field with a modulator in such a way that interference phenomena do not occur in the optical beam path, or occur only to an undetectable extent, within a predeterminable time interval, wherein the modulator influences the laser light source.

8. Method according to claim 7, wherein an EOM (electro-optical modulator) is employed as the modulator.

9. Method according to claim 8, wherein the EOM is arranged directly downstream of the laser light source.

10. A confocal scanning microscope adapted to perform the method of claim 8.

11. Method according to claim 7, wherein the modulator switches the laser light source on and off.

12. Method according to claim 7, wherein the modulator influences the pump current of the laser light source.

13. A confocal scanning microscope adapted to perform the method of claim 12.

14. Method according to claim 7, wherein the modulator influences an intensity of the light.

15. Method according to claim 7, wherein the modulator influences a laser resonator or an optical medium of the light.

16. Method according to claim 15, wherein the modulator is a piezo element which at least one of moves and deforms at least one component of the laser resonator or the optical medium.

17. A confocal scanning microscope adapted to perform the method of claim 15.

18. Method according to claim 7, wherein a noise signal, a periodic signal or a stochastic signal is applied to the modulator.

19. Method according to claim 18, wherein a noise generator is used to produce the noise signal.

20. A confocal scanning microscope adapted to perform the method of claim 18.

21. Method according to claim 7, wherein the method is used with a confocal scanning microscope.

22. Method according to claim 21, wherein the predeterminable time interval is shorter than the pixel clock of the confocal scanning microscope.

23. Method according to claim 22, wherein the predeterminable time interval is shorter than a time interval corresponding to half the pixel clock.

24. Method according to claim 21, wherein the modulator is adapted to modulate in synchronization with a scanning process of the confocal scanning microscope.

25. A confocal scanning microscope adapted to perform the method of claim 7.

* * * * *